(12) United States Patent
Vobilishetti et al.

(10) Patent No.: US 12,402,132 B2
(45) Date of Patent: Aug. 26, 2025

(54) METHOD AND SYSTEM FOR ALLOCATING PUCCH RESOURCES TO USER EQUIPMENTS IN A COMMUNICATION NETWORK

(71) Applicant: Samsung Electronics Co., Ltd., Suwon-si (KR)

(72) Inventors: Harikrishna Vobilishetti, Karnataka (IN); Sridharan Bharathi Ramulu, Karnataka (IN); Swaraj Kumar, Karnataka (IN); Saumil Maniar, Karnataka (IN); Vishal Murgai, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 421 days.

(21) Appl. No.: 17/961,417

(22) Filed: Oct. 6, 2022

(65) Prior Publication Data

US 2023/0068143 A1 Mar. 2, 2023

Related U.S. Application Data

(63) Continuation of application No. PCT/KR2022/012902, filed on Aug. 29, 2022.

(30) Foreign Application Priority Data

Aug. 30, 2021 (IN) .............................. 202141039264
Jul. 28, 2022 (IN) .............................. 202141039264

(51) Int. Cl.
*G06N 3/02* (2006.01)
*G06N 20/00* (2019.01)
(Continued)

(52) U.S. Cl.
CPC .............. *H04W 72/21* (2023.01); *G06N 3/02* (2013.01); *G06N 20/00* (2019.01); *H04B 17/26* (2015.01);
(Continued)

(58) Field of Classification Search
CPC ....... G06N 3/02–105; G06N 20/00–20; H04B 17/0082–3913; H04L 1/12–1896;
(Continued)

(56) References Cited

U.S. PATENT DOCUMENTS 9,369,922 B2 6/2016 Han et al.
9,661,441 B2 5/2017 Da Silva et al.
(Continued)

FOREIGN PATENT DOCUMENTS

CN 106257856 12/2016
CN 112566258 3/2021
(Continued)

OTHER PUBLICATIONS

Indian Office Action issued Jun. 26, 2023 in corresponding Indian Patent Application No. 202141039264.
(Continued)

*Primary Examiner* — Timothy J Weidner
(74) *Attorney, Agent, or Firm* — Nixon & Vanderhye, P.C.

(57) ABSTRACT

The present disclosure relates to method and resource allocation entity for allocating Physical Uplink Control Channel (PUCCH) resources to User Equipments (UEs) in a communication network. The method comprises identifying one or more PUCCH resource pools to be allocated to cell camped on by one or more UEs, based on one or more first parameters associated with cell, using machine learning model. Further, the method comprises identifying one or more PUCCH resources to be allocated to each UE, based on
(Continued)

one or more PUCCH resources pools and one or more second parameters associated with corresponding UE, using machine learning model. The method comprises allocating one or more PUCCH resource sets from plurality of PUCCH resource sets to each UE, based on one or more PUCCH resources identified for each UE and one or more parameters of plurality of PUCCH resource sets.

12 Claims, 8 Drawing Sheets

(51) Int. Cl.
| | |
|---|---|
| H04B 17/26 | (2015.01) |
| H04B 17/391 | (2015.01) |
| H04W 72/02 | (2009.01) |
| H04W 72/0446 | (2023.01) |
| H04W 72/0453 | (2023.01) |
| H04W 72/21 | (2023.01) |
| H04W 72/23 | (2023.01) |
| H04W 72/51 | (2023.01) |
| H04W 72/542 | (2023.01) |
| H04W 84/02 | (2009.01) |
| H04W 88/02 | (2009.01) |
| H04W 88/08 | (2009.01) |
| H04W 92/02 | (2009.01) |
| H04W 92/10 | (2009.01) |

(52) U.S. Cl.
CPC ........ *H04B 17/3913* (2015.01); *H04W 72/02* (2013.01); *H04W 72/0446* (2013.01); *H04W 72/0453* (2013.01); *H04W 72/23* (2023.01); *H04W 72/51* (2023.01); *H04W 72/542* (2023.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ............ H04L 5/0001–0098; H04W 8/22–245; H04W 24/02–10; H04W 28/02–26; H04W 72/02–569; H04W 84/02–16; H04W 88/02–12; H04W 92/02–04; H04W 92/10
See application file for complete search history.

(56) References Cited

U.S. PATENT DOCUMENTS

| | | | |
|---|---|---|---|
| 9,730,199 | B2 | 8/2017 | Seo et al. |
| 10,932,236 | B2 | 2/2021 | Li et al. |
| 11,405,940 | B2 | 8/2022 | Akkarakaran et al. |
| 11,503,577 | B2 | 11/2022 | Li et al. |
| 2019/0261353 | A1 | 8/2019 | Wang et al. |
| 2019/0261356 | A1 | 8/2019 | Myung et al. |
| 2021/0068148 | A1 | 3/2021 | Yamamoto et al. |
| 2024/0205956 | A1* | 6/2024 | Tayamon ............ H04W 72/21 |

FOREIGN PATENT DOCUMENTS

| | | |
|---|---|---|
| EP | 2 448 158 | 5/2012 |
| EP | 3232595 | 10/2017 |
| EP | 3294029 | 3/2018 |
| WO | 2015/178566 | 11/2015 |
| WO | 2017/127126 | 7/2017 |
| WO | 2021/101347 | 5/2021 |
| WO | 2021/167749 | 8/2021 |
| WO | WO-2022090766 A1 * 5/2022 ............ H04W 72/21 |

OTHER PUBLICATIONS

Search Report and Written Opinion dated Dec. 21, 2022 issued in International Patent Application No. PCT/KR2022/012902.
3GPP TSG-RAN, "Summary#1 of email thread", Meeting Notes, Meeting #102-e, Aug. 17-28, 2020, 16 pages.
Extended European Search Report dated Sep. 9, 2023 issued in European Patent Application No. 22864989.3.

* cited by examiner

METHOD AND SYSTEM FOR ALLOCATING PUCCH RESOURCES TO USER EQUIPMENTS IN A COMMUNICATION NETWORK

CROSS-REFERENCE TO RELATED APPLICATIONS

This application is a continuation of International Application No. PCT/KR2022/012902 designating the United States, filed on Aug. 29, 2022, in the Korean Intellectual Property Receiving Office and claiming priority to Indian Provisional Patent Application No. 202141039264, filed on Aug. 30, 2021, in the Indian Patent Office, and to Indian Complete Patent Application No. 202141039264, filed on Jul. 28, 2022, in the Indian Patent Office, the disclosures of all of which are incorporated by reference herein in their entireties.

BACKGROUND

Field

The disclosure relates to the field of telecommunication networking. For example, the present disclosure relates to a method and a system for allocating Physical Uplink Control Channel (PUCCH) resources to user equipments in a communication network.

Description of Related Art

Physical Uplink Control Channel (PUCCH) is used by a User Equipment (UE) to transmit Uplink Control Information (UCI) of the UE to a base station in a communication network. The UCI includes Scheduling Request (SR), Channel State Information (CSI), Hybrid Automatic Repeat Request Acknowledgement/Negative Acknowledgment (HARQ ACK/NACK), and the like. The UE needs resources to transmit the UCI over the PUCCH. The base station configures the resources to the UE. The resources configured to the UE are associated with a periodicity and an offset. A shorter value of the periodicity and the offset provides multiple benefits to the UE such as ability to latch to the communication network quickly, faster updating of dynamic characteristics to the base station, reduce latency in data transmission, and the like.

In conventional Radio Resource Management (RRM) systems, the resources are allocated to UEs statically at cell level which may be not always be optimal. The conventional RRM systems allocate the resources based on first come first serve basis as illustrated in FIG. 1. FIG. 1 shows an example illustrating three UEs e.g., UE "1", UE "32", and UE "128". The UE "1" transmits a request to the base station. The UE "1" is first UE to attach to the communication network. Consider for example, the base station allocates PUCCH resource sets with periodicity 5 ms to the UE "1". The PUCCH resource sets with the periodicity 5 ms may be allocated up to 12 UEs. Similarly, the UE "32" is $32^{nd}$ UE to attach to the communication network. The base station allocates PUCCH resource sets with periodicity say for example, 20 ms to the UE "32". The PUCCH resource sets with the periodicity 20 ms may be allocated up to 32 UEs. The UE "128" is $128^{th}$ UE to attach to the communication network. The base station allocates PUCCH resource sets with periodicity say for example, 40 ms to the UE "128". The PUCCH resource sets with the periodicity 40 ms may be allocated up to 128 UEs. Hence, in the conventional RRM systems, the UE which attaches to the communication network first is allocated with shorter periodicity irrespective of requirements of the UE. The conventional RRM systems does not consider service type, UE specific capabilities, and the like, when allocating the resources to the UE, thus leading to under or over utilization of resources. This also leads to increase in latency for high priority UEs. Further, the latency increases with greater number of UEs attaching to the communication network.

The information disclosed in this background of the disclosure section is simply for enhancement of understanding of the general background and should not be taken as an acknowledgement or any form of suggestion that this information forms the prior art already known to a person skilled in the art.

SUMMARY

In an example embodiment, the present disclosure discloses a method of allocating physical uplink control channel (PUCCH) resources to user equipments (UEs) in a communication network. The method comprises: identifying one or more PUCCH resource pools to be allocated to a cell camped on by one or more UEs based on one or more first parameters associated with the cell, using a machine learning model; identifying one or more PUCCH resources to be allocated to each UE from the one or more UE based on the one or more PUCCH resource pools and one or more second parameters associated with corresponding UE, using the machine learning; and allocating one or more PUCCH resource sets from a plurality of PUCCH resource sets to each UE from the one or more UEs, based on the one or more PUCCH resources identified for each UE and one or more parameters of plurality of PUCCH resource sets.

In an example embodiment, the present disclosure discloses a method of allocating physical uplink control channel (PUCCH) resources to user equipments (UEs) in a communication network. The method comprises: identifying one or more PUCCH resource pools to be allocated to a cell camped on by one or more UEs based on one or more first parameters associated with the cell; identifying one or more PUCCH resources to be allocated to each UE from the one or more UE based on the PUCCH resource pools and one or more second parameters associated with corresponding UE; and allocating one or more PUCCH resource sets from a plurality of PUCCH resource sets to each UE from the one or more UEs, based on the one or more PUCCH resources identified for each UE and one or more parameters of plurality of PUCCH resource sets.

In an example embodiment, the present disclosure discloses a resource allocation entity configured to allocate physical uplink control channel (PUCCH) resources to user equipments (UEs) in a communication network. The resource allocation entity is associated with a base station in the communication network. The resource allocation entity comprises: one or more processors and a memory, wherein one or more processors are configured to: identify one or more PUCCH resource pools to be allocated to a cell camped on by one or more UEs based on one or more first parameters associated with the cell; identify one or more PUCCH resources to be allocated to each UE from the one or more UE based on the PUCCH resource pools and one or more second parameters associated with corresponding UE; and allocate one or more PUCCH resource sets from a plurality of PUCCH resource sets to each UE from the one or more UEs, based on the one or more PUCCH resources identified for each UE and one or more parameters of plurality of PUCCH resource sets.

In an example embodiment, the present disclosure discloses resource allocation entity associated with a base station in a communication network. The resource allocation entity comprise one or more processors; and a memory storing processor-executable instructions, which, on execution, cause the one or more processors to identify, by the resource allocation entity, one or more physical uplink control channel (PUCCH) resource pools to be allocated to a cell camped on by one or more user equipments (UEs), based on one or more first parameters associated with the cell, identify, by the resource allocation entity, one or more PUCCH resources to be allocated to a UE from the one or more UEs, based on the one or more PUCCH resource pools and one or more second parameters associated with the UE, and allocate, by the resource allocation entity, one or more PUCCH resource sets from a plurality of PUCCH resource sets to the UE from the one or more UEs, based on the one or more PUCCH resources identified for the UE and one or more parameters of the plurality of PUCCH resource sets.

In an example embodiment, the present disclosure discloses a method performed by a user equipment (UE) in a communication network, the method comprises receiving, from a resource allocation entity associated with a base station. The method comprises one or more physical uplink control channel (PUCCH) resource sets associated with a cell; identifying a PUCCH resource set from the one or more PUCCH resource sets. The method comprises performing an uplink transmission based on a periodicity and an offset associated with the PUCCH resource set.

In an example embodiment, the present disclosure discloses a user equipment (UE) in a communication network. The UE comprises one or more transceivers; one or more processors coupled to the one or more transceivers; and a memory storing processor-executable instructions, which, on execution, cause the one or more processors to: receive, from a resource allocation entity associated with a base station, one or more physical uplink control channel (PUCCH) resource sets associated with a cell; identify a PUCCH resource set from the one or more PUCCH resource sets; and perform an uplink transmission based on a periodicity and an offset associated with the PUCCH resource set.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other aspects, features and advantages of certain embodiment of the present disclosure will be more apparent from the following detailed description, taken in conjunction with the accompanying drawings, in which.

Figure 1:
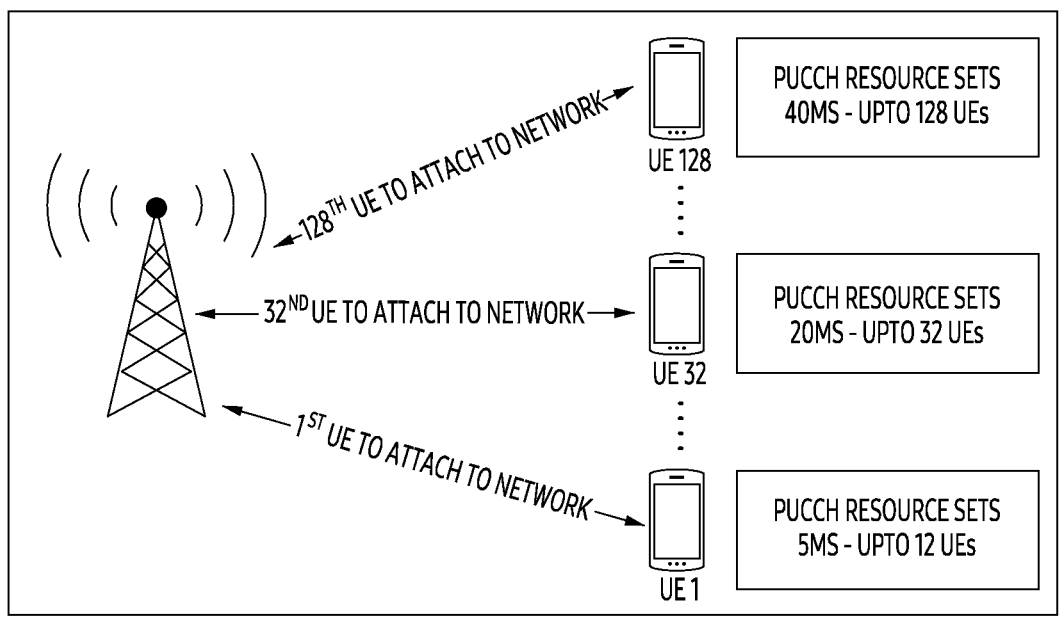
FIG. 1 is a diagram illustrating example allocation of physical uplink control channel (PUCCH) resources in conventional radio resource management (RRM) systems.

It should be appreciated by those skilled in the art that any block diagram herein represents conceptual views of illustrative systems embodying the principles of the present disclosure. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the disclosure, the word "exemplary" is used herein to refer, for example, to "serving as an example, instance, or illustration." Any embodiment of the disclosure described herein as "exemplary" is not necessarily to be construed as preferred or advantageous over other embodiments.

While the disclosure is susceptible to various modifications and alternative forms, specific embodiments thereof are shown by way of example in the drawings and will be described in greater detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Physical uplink control channel (PUCCH) resources are required for a UE to transmit uplink control information (UCI) in a communication network. A base station needs to allocate the PUCCH resources to the UE. A shorter value of the periodicity and the offset provides multiple benefits to the UE and helps in efficient communication in the communication network. Conventional systems allocate the resources based on first come first served basis and do not consider parameters of the UE leading to under or over utilization of resources and increased latency while attaching to the communication network.

The disclosure provides a method and a resource allocation entity for allocating the PUCCH resources to the UEs. The PUCCH resource pools to be allocated to a cell camped on by UEs are identified based on parameters of the cell. The PUCCH resources to be allocated to each UE in the cell are identified based on parameters of the UE. PUCCH resource sets are allocated to each UE, based on the PUCCH resources identified for each UE and parameters of plurality of PUCCH resource sets such as periodicity and offset. Accordingly, the disclosure provides an efficient way of allocating the PUCCH resources based on the parameters of the cell (for instance, number of UEs supported by the cell) and parameters of the UE (for instance, requirements and capabilities of the UE).

In an embodiment of the disclosure, the PUCCH resource pools to be allocated to the cell and the PUCCH resources to be allocated to each UE is identified by a machine learning model. The machine learning model improves decision making in allocation of the PUCCH resources (for instance, historical latency observations for the UE). Hence, the disclosure helps to reduce latency and delay experienced by the UE, by allocating the PUCCH resources based on required services, thereby improving quality of experience (QoE) of a user associated with the UE. Optimized resource sets can be used for allocating physical uplink shared channel (PUSCH) resources, thereby enhancing cell throughput performance.

Figure 2:
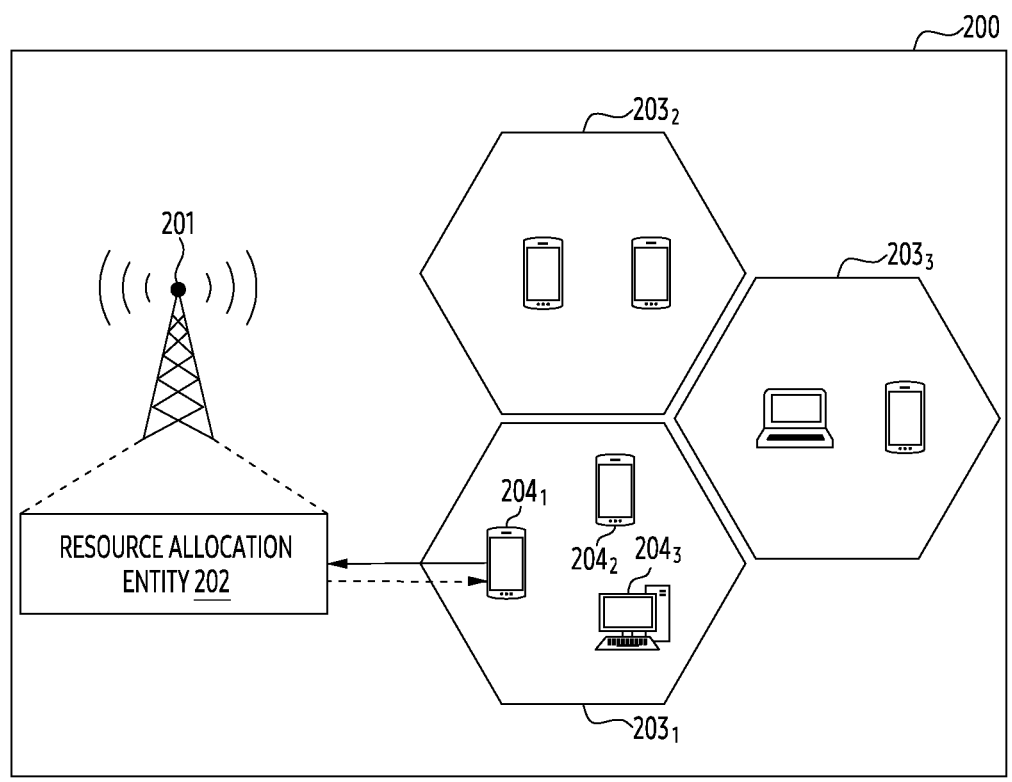
FIG. 2 is a diagram illustrating an example environment for allocating PUCCH resources to user equipments (UEs) in a communication network, according to various embodiments.

FIG. 2 is a diagram illustrating an example environment for allocating PUCCH resources to UEs in a communication network 200, according to various embodiments. The communication network 200 may be a wireless communication network comprising a Fourth Generation (4G) network, a Fifth Generation (5G) network, an Advanced 5G network, a 5G New Radio (NR) network, and the like. The communication network 200 may comprise a base station 201 and one or more cells $203_1, 203_2, 203_3, \ldots, 203_N$ associated with the base station 201. The base station 201 may be for instance, an eNodeB, a 4G Long Term Evolution (LTE) base station, a central unit (CU) and a distributed unit (DU), and the like. The communication network 200 may also include multiple base stations and other devices that are not illustrated in FIG. 1, and this should not be considered as limiting. Each of the one or more cells $203_1, 203_2, 203_3, \ldots, 203_N$ may be camped on by one or more UEs. For instance, the cell $203_1$ may be camped on by the one or more UEs $204_1, 204_2, 204_3, \ldots, 204_N$. The reference is made to the cell $203_1$ hereafter in the present description for explanation purposes. The cell $203_1$ is referred as the cell 203 hereafter in the present description. The one or more UEs $204_1, 204_2, 204_3, \ldots, 204_N$ are referred as the one or more UEs 204 hereafter in the present description. Each of the one or more UEs 204 may be a handheld device associated with a user. For example, each of the one or more UEs 204 may be a smartphone, a tablet, and the like. Each of the one or more UEs 204 may be any computing device such as a laptop computer, a desktop computer, a personal computer (PC), a notebook, a smartphone, a tablet, e-book readers, a server, a network server, a cloud-based server, internet of things (IoT) device, vehicle, and the like.

The base station 201 comprises a resource allocation entity (e.g., including various circuitry and/or executable program instructions) 202 for allocating the PUCCH resources to the one or more UEs 204 in the communication network 200. The base station 201 comprises multiple other components/entities that are not illustrated in FIG. 1, and this should not be considered as limiting. The resource allocation entity 202 may identify one or more PUCCH resource pools to be allocated to a cell 203, based on one or more first parameters of the cell 203 using a machine learning model. For example, the machine learning model identifies the PUCCH resources to be allocated for a particular configuration of cell based on learning over a period.

The resource allocation entity 202 may identify one or more PUCCH resources to be allocated to each UE from the one or more UEs 204, based on the one or more PUCCH resource pools and one or more second parameters of corresponding UE, using the machine learning model. For example, the machine learning model identifies the PUCCH resources to be allocated to a UE based on data rate requirement of the UE. Then, the resource allocation entity 202 may allocate one or more PUCCH resource sets from a plurality of PUCCH resource sets to each UE from the one or more UEs 204, based on the one or more PUCCH resources and one or more parameters of plurality of PUCCH resource sets. The one or more parameters may include, a periodicity and an offset associated with a PUCCH resource set. In an example, the resource allocation entity 202 may allocated two resource sets with periodicity 5 ms to a UE, based on a historical latency observed for the UE.

In an embodiment, the resource allocation entity 202 may identify the one or more PUCCH resource pools to be allocated to a cell 203, based on the one or more first parameters of the cell 203. For example, the resource allocation entity 202 identifies a number of scheduling request (SR) resources to be allocated to the cell 203 based on a maximum number of the UEs supported by the cell 203. Further the resource allocation entity 202 may identify the one or more PUCCH resources to be allocated to each UE from the one or more UEs 204, based on the PUCCH resource pools and the one or more second parameters of corresponding UE. For example, the resource allocation entity 202 identifies a number of channel state information (CSI) resources to be allocated to a UE based on the priority of the UE. Then, the resource allocation entity 202 may allocate one or more PUCCH resource sets from a plurality of PUCCH resource sets to each UE from the one or more UEs 204, based on the one or more PUCCH resources and the one or more parameters of plurality of PUCCH resource sets.

Figure 3:
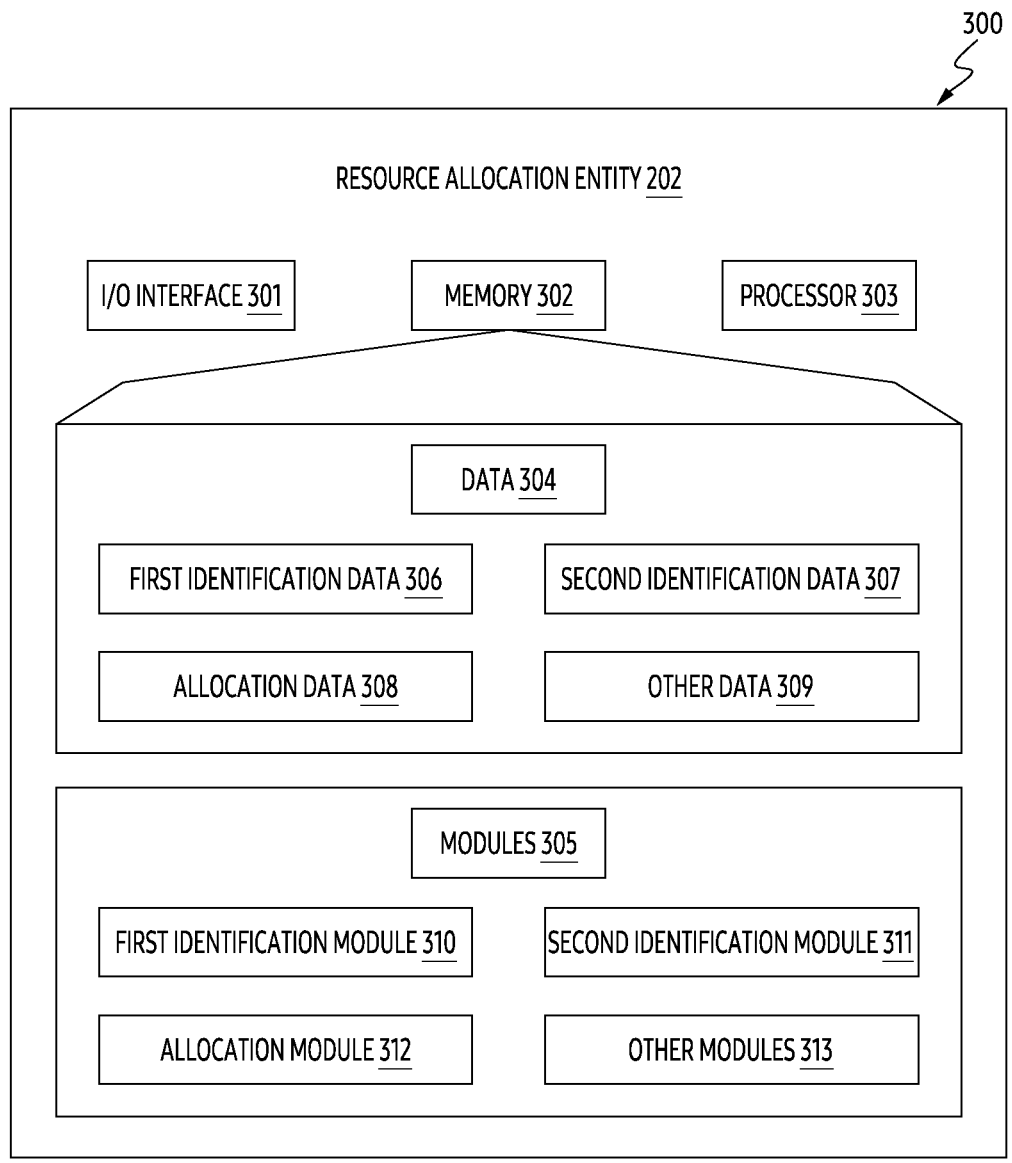
FIG. 3 is a block diagram illustrating an example configuration of a resource allocation entity for allocating the PUCCH resources to the UEs in the communication network, according to various embodiments.

FIG. 3 is a block diagram 300 illustrating an example configuration of the resource allocation entity 202 for allocating the PUCCH resources to the one or more UEs 204 in the communication network 200, according to various embodiments. The resource allocation entity 202 may include input/output (I/O) interface (e.g., including I/O circuitry) 301, a memory 302, and Central Processing Units (e.g., including various processing circuitry) 303 (also referred as "CPUs" or "one or more processors 303"). In various embodiments, the memory 302 may be communicatively coupled to the one or more processors 303. The memory 302 stores instructions executable by the one or more processors 303. The one or more processors 303 may comprise at least one data processor for executing program components for executing user or system-generated requests. The memory 302 may be communicatively coupled to the one or more processors 303. The memory 302 stores instructions, executable by the one or more processors 303, which, on execution, may cause the one or more processors 303 to allocate the PUCCH resources to the one or more UEs 204 in the communication network 200. The I/O interface 301 is coupled with the one or more processors 303 through which an input signal or/and an output signal is communicated. For example, information related to allocation of the one or more resource sets may be transmitted to each of the one or more UEs 204 via the I/O interface 301. In an embodiment, the resource allocation entity 202 may be implemented in a variety of computing systems, such as a laptop computer, a desktop computer, a Personal Computer (PC), a notebook, a smartphone, a tablet, a server, a network server, a cloud-based server, and the like.

In an embodiment, the memory 302 may include one or more modules 305 and data 304. The one or more modules 305 may be configured to perform the steps of the present disclosure using the data 304, to allocate the PUCCH resources to the one or more UEs 204 in the communication network 200. In an embodiment, each of the one or more modules 305 may be a hardware unit which may be outside the memory 302 and coupled with the resource allocation entity 202. As used herein, the term modules 305 refers to an application specific integrated circuit (ASIC), an electronic circuit, a field-programmable gate arrays (FPGA), programmable system-on-Chip (PSoC), a combinational logic circuit, executable program instructions and/or other suitable components that provide described functionality. The one or more modules 305 when configured with the described functionality defined in the present disclosure will result in a novel hardware.

In an example, the modules 305 may include, for example, a first identification module 310, a second identification module 311, an allocation module 312, and other modules 313. It will be appreciated that such aforementioned modules 305 may be represented as a single module or a combination of different modules. In an example, the data 304 may include, for example, first identification data 306, second identification data 307, allocation data 308, and other data 309.

In an embodiment, the first identification module 310 is configured to identify one or more PUCCH resource pools to be allocated to the cell 203 camped on by one or more UEs 204. The first identification module 310 identifies the PUCCH resource pools based on one or more first parameters associated with the cell 203, using a machine learning model. The one or more first parameters may include at least one of physical random-access channel (PRACH) configuration of the cell 203 and neighboring cells, a transmission mode of the cell 203, a subcarrier spacing (SCS) value configured in the cell 203, a maximum number of UEs supported in the cell 203, a maximum number of scheduling requests (SRs) supported in the cell 203, a bandwidth associated with the cell 203, or a presence of dynamic spectrum sharing slots and resource sets in the cell 203. Each of the one or more PUCCH resource pools are associated with a periodicity and an offset. The first identification module 310 may identify the one or more PUCCH resource pools based on the PRACH configuration by identifying PRACH configuration index of the cell 203 and the neighboring cells. The PRACH configuration index defines when the UE can transmit RACH to the base station 201 e.g., the PRACH configuration index defines RACH slots. The first identification module 310 may identify whether the RACH slots may be used as PUCCH slots. In an example, the usage of the RACH slots as PUCCH slots may be based on a cell configuration. When the RACH slots cannot be used as the PUCCH slot, the first identification module 310 may not consider such RACH slots when allocating the one or more PUCCH resource pools. In an example, the machine learning model may determine whether the RACH slots may be used as the PUCCH slots based on past usage of the RACH slots as the PUCCH slots for a particular cell configuration.

The first identification module 310 may identify the one or more PUCCH resource pools based on the transmission mode of the cell 203. For example, the first identification module 310 may identify a duplex type as one of, a time division duplex (TDD) and a frequency division duplex (FDD). In an example, when the communication network 200 is 5G NR, there are 255 different slot formats. The PUCCH slot may be either uplink slot or flexi slot. The first identification module 310 may identify the PUCCH slots based on the transmission mode. The first identification module 310 may identify the one or more PUCCH resource pools based on the subcarrier spacing (SCS) value configured in the cell 203. The SCS defines the number of the PUCCH slots and the periodicity. The first identification module 310 may identify the one or more PUCCH resource pools based on a maximum number of UEs supported in the cell 203. The first identification module 310 may identify a maximum number of the PUCCH resources to be allocated to the cell 203 based on the maximum number of UEs supported in the cell 203. The machine learning model may identify the maximum number of UEs supported in the cell 203 by monitoring the cell 203 over a period of time. The first identification module 310 may identify the one or more PUCCH resource pools based on a maximum number of scheduling requests (SRs) supported in the cell 203. The first identification module 310 identifies the maximum number of SRs that can be allocated for the one or more UEs 204 for a given slot. The first identification module 310 may identify the one or more PUCCH resource pools based on a bandwidth associated with the cell 203. For instance, the first identification module 310 may identify resources to be allocated across a bandwidth part (BWP). The machine learning model may determine past allocation of resources for a particular BWP. The first identification module 310 may identify the one or more PUCCH resource pools based on a presence of dynamic spectrum sharing slots and resource sets in the cell 203. The first identification module 310 may identify the presence of dynamic spectrum sharing slots and resource sets as such slots and resource sets cannot be allocated as the PUCCH resource slots and the resource sets. The one or more PUCCH resource pools identified may be stored as the first identification data 306 in the memory 302.

In an embodiment, the second identification module 311 may be configured to receive the first identification data 306 from the first identification module 310. Further, the second identification module 311 may be configured to identify one or more PUCCH resources to be allocated to each UE from the one or more UEs 204. The second identification module 311 may identify the one or more PUCCH resources based on the one or more PUCCH resource pools and one or more second parameters associated with corresponding UE, using the machine learning model. The one or more second parameters of each UE may comprise at least one of, quality of service (QoS) class identifiers (QCI) characteristics of one or more services required by corresponding UE, one or more UE capabilities, historical latency observations associated with PUCCH resources allocated to the one or more services, or a type of UE in the cell 203. The second identification module 311 may identify the one or more PUCCH resources based on the QCI characteristics such as, priority level, packet delay budget, packet error rate, data burst volume, and the like. The QCI characteristics may be 5G QI, 5G QFI, 4G QCI, and the like, based on the communication network 200. In an example, target parameters for a highest priority service among current services used by the UE may be considered for allocation of the PUCCH resources.

The second identification module 311 may identify the one or more PUCCH resources based on the one or more UE capabilities. For instance, the one or more UE capabilities may include semi-static or dynamic hybrid automatic repeat request (HARQ). The second identification module 311 may determine a number of uplink (UL) resources to be allocated for the PUCCH, based on a number of carrier components (CC) requested to be allocated for the UE. The second identification module 311 may identify the one or more PUCCH resources based on the historical latency observations associated with the PUCCH resources allocated to the one or more services. The machine learning model may monitor average latency for a particular UE over a period of time. In an example, a resource set with a periodicity of 40 ms may be allocated in the past to the UE. In such an example, the UE may have experienced severe latency for a high priority service used by the UE. Hence, in such case, the machine learning model may determine that a different resource set with a shorter value of the periodicity needs to be allocated to the UE. The second identification module 311 may identify the one or more PUCCH resources based on the type of UE in the cell 203. For instance, the type of UE in the cell 203 may be a cell-edge UE. The cell-edge UE is a UE located at the edge of a cell, e.g., far away from a base station. The cell-edge UE typically experience a low signal-to-Interference-plus-noise-ratio(SINK), which leads to considerably low achievable data rates. The second identification module 311 may identify the PUCCH resources to be allocated for transmission of a greater number of symbols to the cell-edge UE such that robustness of PUCCH channel is increased for the cell-edge UE. The one or more PUCCH resources identified may be stored as the second identification data 307 in the memory 302.

Figure 4A:
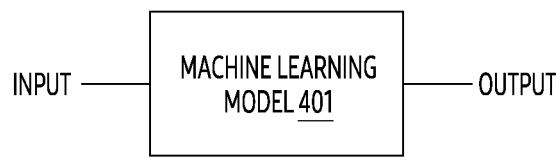
FIGS. 4A and 4B are diagrams illustrating example machine leaning models for identifying one or more PUCCH resource pools and one or more PUCCH resources, according to various embodiments.
Figure 4B:
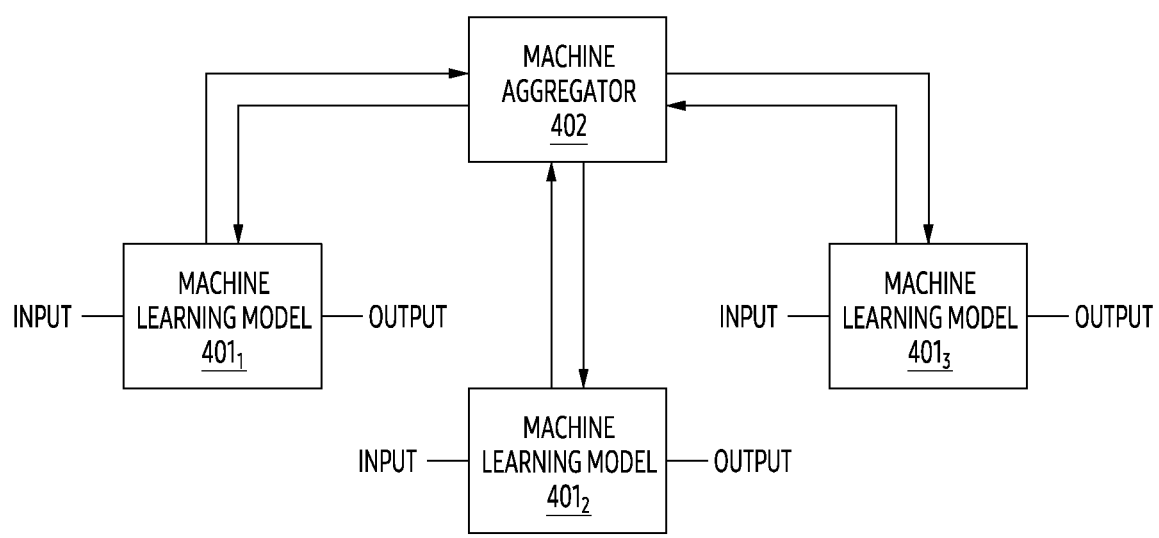

Reference is now made to FIGS. 4A and 4B illustrating examples of the machine leaning model for identifying the one or more PUCCH resource pools and the one or more PUCCH resources, according to various embodiments o. FIG. 4A illustrates a machine learning model 401 trained using localized training In the localized training, the machine learning model 401 is provided with inputs (for instance, the first set of parameters and the second set of parameters). The machine learning model 401 comprises multiple hidden layers. The machine learning model 401 continuously adjusts weights based on predicted output and actual output and provides outputs (for instance, the periodicity and the offset of a PUCCH resource set for a UE). In an example, the localized training is provided on an edge cloud associated with the base station 201. Parameters such as, a number of hidden layers, learning rate, dimension of hidden layers, weight initialization, and the like are adjusted, based on a radio access network (RAN) deployment such as virtual RAN (VRAN), Open RAN (ORAN), centralized RAN (CRAN), and the like. The parameters are adjusted based on hyperparameter optimization, Bayesian optimization, and the like. One skilled in the art will appreciate that optimization techniques other than the above-mentioned techniques may be used to adjust the parameters. The machine learning model 401 may include one of, dense neural network, generative adversarial network (GAN), recurrent neural network (RNN), convolutional neural network (CNN), and the like. A person skilled in the art will appreciate that any machine learning techniques other than the above-mentioned techniques may be used for identifying the one or more PUCCH resource pools and the one or more PUCCH resources.

FIG. 4B illustrates an example machine learning model trained using federated training. The outputs from multiple machine learning models $401_1$, $401_2$, and $401_3$ implemented at multiple base stations are combined at model aggregator 402. The model aggregator 402 communicates learning of other machine learning models to each machine learning model at fixed intervals and weights are updated using back propagation and federated averaging. The federated training enables training the machine learning models $401_1$, $401_2$, and $401_3$ on varying dataset. The type of training may be selected based on data storage mechanism, computational resources availability, computational power, and the like. The performance of each of the machine learning models $401_1$, $401_2$, and $401_3$ may be evaluated and improvised.

Referring back to FIG. 3, in an embodiment, the allocation module 312 may be configured to receive the second identification data 307 from the second identification module 311. The allocation module 312 may allocate one or more PUCCH resource sets from a plurality of PUCCH resource sets to each UE from the one or more UEs 204. The allocation module 312 may configure the plurality of PUCCH resource sets to the one or more UEs 204 based on the one or more PUCCH resources identified for each UE. Further, the allocation module 312 may allocate the one or more PUCCH resource sets from the plurality of PUCCH resource sets based on one or more parameters of plurality of PUCCH resource sets. The one or more parameters of each of the one or more PUCCH resource sets may comprise, the periodicity and the offset associated with corresponding PUCCH resource set. The one or more parameters are determined by the machine learning model based on the one or more first parameters. For instance, the periodicity of each PUCCH resource set may be determined based on the maximum number of UEs supported by the cell 203. The one or more PUCCH resource sets may be allocated to transmit at least one of, but not limited to, scheduling request (SR), channel state information (CSI), hybrid automatic repeat request-acknowledge/negative/acknowledge (HARQ-ACK/NACK), and the like. Consider an example illustrated in FIG. 5. The allocation module 312 may configure say for example, fifty PUCCH resource sets to the first cell. A UE "1" may be the first UE to attach to the communication network 200. However, packet delay budget required for a service currently used by the UE "1" may be greater than the packet delay budget required for a service currently used by the UE "128". Hence, the UE "1" may be given a lower priority than the UE "128". The UE "1" may be allocated with a PUCCH resource set with the periodicity say for example, of 40 ms. The UE "128" may be allocated with two PUCCH resources sets with the periodicity say for example, of 5 ms. The one or more PUCCH resource sets allocated to each UE may be stored as the allocation data 308 in the memory 302.

Referring back to FIG. 3, the other data 309 may store data, including temporary data and temporary files, generated by the one or more modules 305 for performing the various functions of the resource allocation entity 202. The other data 309 may be stored in the memory 302. The one or more modules 305 may also include the other modules 313 to perform various miscellaneous functionalities of the resource allocation entity 202. It will be appreciated that the one or more modules 305 may be represented as a single module or a combination of different modules.

In an embodiment, at least one of the modules 305 may be implemented through an AI model or the machine learning model. A function associated with AI may be performed through a non-volatile memory, a volatile memory, and the one or more processors 303. The one or more processors 303 may include various processing circuitry, such as, for example, a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or more processors 303 control the processing of data in accordance with a predefined operating rule or the machine learning model stored in the non-volatile memory and the volatile memory. The predefined operating rule or the machine learning model is provided through training or learning. Here, being provided through learning may refer, for example, to, by applying a learning algorithm to learning data, a predefined operating rule or the machine learning model of a desired characteristic being made. The learning may be performed in a device itself in which AI according to an embodiment is performed, and/or may be implemented through a separate server/system. The machine learning model may include a plurality of neural network layers. Each layer has a plurality of weight values and performs a layer operation through calculation of a previous layer and an operation of a plurality of weights. Examples of the machine learning model include, but are not limited to, convolutional neural network (CNN), deep neural network (DNN), recurrent neural network (RNN), restricted Boltzmann machine (RBM), deep belief network (DBN), bidirectional recurrent deep neural network (BRDNN), generative adversarial networks (GAN), and deep Q-networks. The learning algorithm is a method for training the machine learning model using a plurality of learning data to cause, allow, or control the target device to make a determination or prediction. Examples of learning algorithms include, but are not limited to, supervised learning, unsupervised learning, semi-supervised learning, reinforcement learning, and the like.

Figure 6:
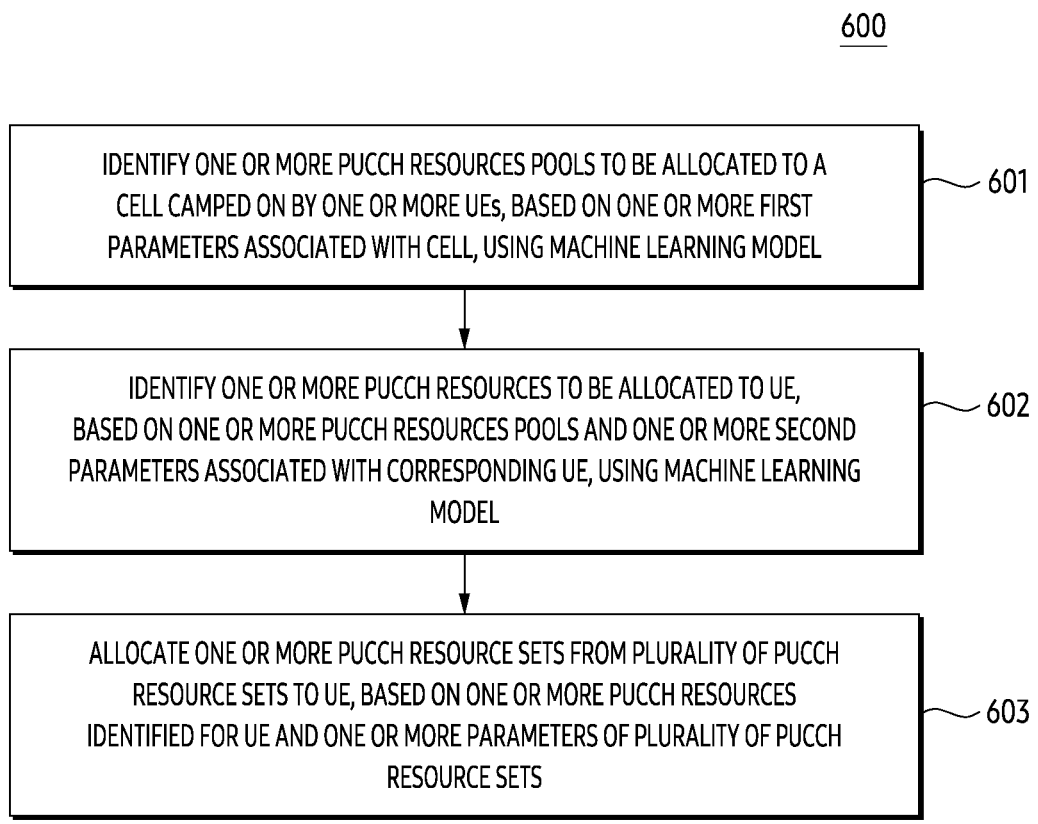
FIG. 6 is a flowchart illustrating an example method for allocating the PUCCH resources to the UEs in the communication network, according to various embodiments.

FIG. 6 is a flowchart illustrating an example method for allocating the PUCCH resources to the one or more UEs 204 in the communication network 200, according to various embodiments. As illustrated in FIG. 6, the method 600 may comprise one or more operations. The method 600 may be described in the general context of computer executable instructions. Generally, computer executable instructions can include routines, programs, objects, components, data structures, procedures, modules, and functions, which perform particular functions or implement particular abstract data types.

The order in which the method 600 is described is not intended to be construed as a limitation, and any number of the described method blocks can be combined in any order to implement the method. Additionally, individual blocks may be deleted from the methods without departing from the scope of the disclosure. Furthermore, the method can be implemented in any suitable hardware, software, firmware, or combination thereof.

At operation 601, the resource allocation entity 202 identifies the one or more PUCCH resource pools to be allocated to the cell 203 camped on by the one or more UEs 204. The resource allocation entity 202 identifies the one or more PUCCH resource poolsbased on one or more first parameters associated with the cell 203, using the machine learning model. The one or more first parameters may comprise at least one of, the physical random-access channel (PRACH) configuration of the cell 203 and neighboring cells, the transmission mode of the cell 203, the subcarrier spacing (SCS) value configured in the cell 203, the maximum number of UEs supported in the cell 203, the maximum number of scheduling requests (SRs) supported in the cell 203, the bandwidth associated with the cell 203, or the presence of dynamic spectrum sharing slots and resource sets in the cell 203.

At operation 602, the resource allocation entity 202 identifies the one or more PUCCH resources to be allocated to each UE from the one or more UEs 204. The resource allocation entity 202 may identify the one or more PUCCH resources based on the one or more PUCCH resource pools and one or more second parameters associated with corresponding UE, using the machine learning model. The one or more second parameters of each UE may include at least one of quality of service (QoS) class identifiers (QCI) characteristics of one or more services required by corresponding UE, one or more UE capabilities, historical latency observations associated with PUCCH resources allocated to the one or more services, or a type of UE in the cell 203.

At operation 603, the resource allocation entity 202 allocates the one or more PUCCH resource sets from the plurality of PUCCH resource sets to each UE from the one or more UEs 204. The resource allocation entity 202 may configure the plurality of PUCCH resource sets to the one or more UEs 204 based on the one or more PUCCH resources identified for each UE. Further, the resource allocation entity 202 may allocate the one or more PUCCH resource sets from the plurality of PUCCH resource sets based on one or more parameters of plurality of PUCCH resource sets. The one or more parameters of each of the one or more PUCCH resource sets may comprise, the periodicity and the offset associated with corresponding PUCCH resource set. The one or more parameters are determined by the machine learning model based on the one or more first parameters.

Figure 7:
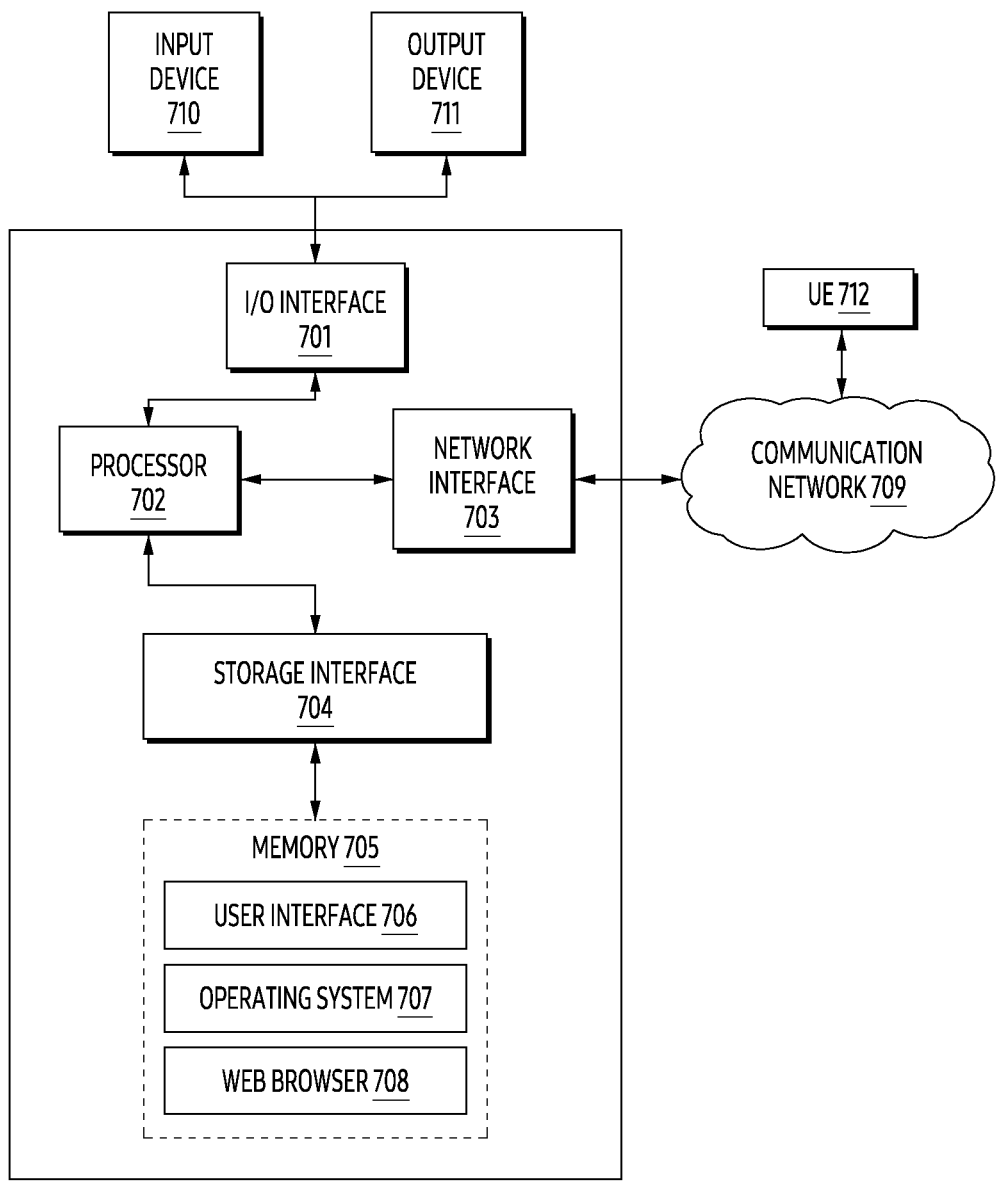
FIG. 7 is a block diagram illustrating an example configuration of a general-purpose computing system for allocating the PUCCH resources to the UEs in the communication network, in according to various embodiments.

FIG. 7 is a block diagram of illustrating an example configuration of a computer system 700 for implementing various embodiments of the disclosure. In an embodiment, the computer system 700 may be the resource allocation entity 202. Thus, the computer system 700 may be used to allocate the PUCCH resources to the one or more UEs 712 in the communication network. The computer system 700 may transmit information related to allocation of the PUCCH resources to the one or more UEs 712 over a communication network 709. The computer system 700 may comprise a Central Processing Unit (e.g., including processing circuitry) 702 (also referred as "CPU" or "processor"). The processor 702 may comprise at least one data processor. The processor 702 may include specialized processing units such as integrated system (bus) controllers, memory management control units, floating point units, graphics processing units, digital signal processing units, etc.

The processor 702 may be disposed in communication with one or more input/output (I/O) devices (not shown) via I/O interface (e.g., including I/O circuitry) 701. The I/O interface 701 may employ communication protocols/methods such as, without limitation, audio, analog, digital, monoaural, RCA, stereo, IEEE (Institute of Electrical and Electronics Engineers)-1394, serial bus, universal serial bus (USB), infrared, PS/2, BNC, coaxial, component, composite, digital visual interface (DVI), high-definition multimedia interface (HDMI), Radio Frequency (RF) antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 701, the computer system 700 may communicate with one or more I/O devices. For example, the input device 710 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 711 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

The processor 702 may be disposed in communication with the communication network 709 via a network interface 703. The network interface 703 may include various interface circuitry and communicate with the communication network 709. The network interface 703 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 709 may include, without limitation, a direct interconnection, local area network (LAN), wide area network (WAN), wireless network (e.g., using Wireless Application Protocol), the Internet, etc. The network interface 703 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 709 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, hypertext transfer protocol (HTTP), transmission control protocol/internet protocol (TCP/IP), wireless application protocol (WAP), etc., to communicate with each other. Further, the first network and the second network may include a variety of network devices, including routers, bridges, servers, computing devices, storage devices, etc.

In various embodiments, the processor 702 may be disposed in communication with a memory 705 (e.g., RAM, ROM, etc. not shown in FIG. 7) via a storage interface (e.g., including storage interface circuitry and/or instructions) 704. The storage interface 704 may connect to memory 705 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 705 may store a collection of program or database components, including, without limitation, user interface 706, an operating system 707, web browser 708 etc. In various embodiments, computer system 700 may store user/application data, such as, the data, variables, records, etc., as described in this disclosure. Such databases may be implemented as fault-tolerant, relational, scalable, secure databases such as Oracle® or Sybase®.

The operating system 707 may facilitate resource management and operation of the computer system 700. Examples of operating systems include, without limitation, APPLE MACINTOSH® OS X, UNIX®, UNIX-like system distributions (E.G., BERKELEY SOFTWARE DISTRIBUTION" (BSD), FREEBSD™, NETBSD™, OPENBSD™, etc.), LINUX DISTRIBUTIONS" (E.G., RED HAT™, UBUNTU™, KUBUNTU™, etc.), IBM™ OS/2, MICROSOFT™ WINDOWS™ (XP™ VISTA™/7/8, 10 etc.), APPLE® IOS™, GOOGLE® ANDROID™, BLACKBERRY® OS, or the like.

In various embodiments, the computer system 700 may implement the web browser 708 stored program component. The web browser 708 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 708 may utilize facilities such as AJAX™ DHTML™, ADOBE® FLASH™, JAVASCRIPT™, JAVA™, Application Programming Interfaces (APIs), etc. In various embodiments, the computer system 700 may implement a mail server (not shown in Figure) stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In various embodiments, the computer system 700 may implement a mail client stored program component. The mail client (not shown in Figure) may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in in accordance with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, e.g., be non-transitory. Examples include random access memory (RAM), read-only memory (ROM), volatile memory, non-volatile memory, hard drives, compact disc read-only memory (CD ROMs), digital video disc (DVDs), flash drives, disks, and any other known physical storage media.

The present disclosure provides a method and a resource allocation entity for allocating the PUCCH resources to the UEs. The PUCCH resource pools to be allocated to a cell camped on by UEs are identified based on parameters of the cell. The PUCCH resources to be allocated to each UE in the cell are identified based on parameters of the UE. PUCCH resource sets are allocated to each UE, based on the PUCCH resources identified for each UE and parameters of plurality of PUCCH resource sets such as periodicity and offset. Hence, the present disclosure provides an efficient way of allocating the PUCCH resources based on the parameters of the cell (for instance, number of UEs supported by the cell) and parameters of the UE (for instance, requirements and capabilities of the UE.

In an embodiment of the present disclosure, the PUCCH resources to be allocated to the cell and the PUCCH resource pools to be allocated to each UE is identified by a machine learning model. The machine learning model improves decision making in allocation of the PUCCH resources (for instance, historical latency observations for the UE). Hence, the present disclosure helps to reduce latency and delay experienced by the UE, by allocating the PUCCH resources based on required services, thereby improving quality of experience (QoE) of a user associated with the UE. Also, optimized resource sets can be used for allocating physical uplink shared channel (PUSCH) resources, thereby enhancing cell throughput performance.

In an example embodiment, the present disclosure discloses a method performed by a resource allocation entity associated with a base station in the communication network, the method comprises identifying, by the resource allocation entity, one or more physical uplink control channel (PUCCH) resource pools to be allocated to a cell camped on by one or more user equipments (UEs), based on one or more first parameters associated with the cell. The method comprises identifying, by the resource allocation entity, one or more PUCCH resources to be allocated to a UE from the one or more UEs, based on the one or more PUCCH resource pools and one or more second parameters associated with the UE. The method comprises allocating, by the resource allocation entity, one or more PUCCH resource sets from a plurality of PUCCH resource sets to the UE from the one or more UEs, based on the one or more PUCCH resources identified for the UE and one or more parameters of the plurality of PUCCH resource sets.

In an example embodiment, the present disclosure discloses resource allocation entity associated with a base station in a communication network. The resource allocation entity comprise one or more processors; and a memory storing processor-executable instructions, which, on execution, cause the one or more processors to identify, by the resource allocation entity, one or more physical uplink control channel (PUCCH) resource pools to be allocated to a cell camped on by one or more user equipments (UEs), based on one or more first parameters associated with the cell, identify, by the resource allocation entity, one or more PUCCH resources to be allocated to a UE from the one or more UEs, based on the one or more PUCCH resource pools and one or more second parameters associated with the UE, and allocate, by the resource allocation entity, one or more PUCCH resource sets from a plurality of PUCCH resource sets to the UE from the one or more UEs, based on the one or more PUCCH resources identified for the UE and one or more parameters of the plurality of PUCCH resource sets.

In an example embodiment, the present disclosure discloses a method performed by a resource allocation entity associated with a base station in the communication network in a communication network. The method comprises identifying, by the resource allocation entity, one or more physical uplink control channel (PUCCH) resource pools to be allocated to a cell camped on by one or more user equipments (UEs) based on one or more first parameters associated with the cell, using a machine learning model. The method comprises identifying, by the resource allocation entity, one or more PUCCH resources to be allocated to a UE from the one or more UEs, based on the one or more PUCCH resource pools and one or more second parameters associated with the UE, using the machine learning model. The method comprises allocating, by the resource allocation entity, one or more PUCCH resource sets from a plurality of PUCCH resource sets to the UE from the one or more UEs, based on the one or more PUCCH resources identified for the UE and one or more parameters of the plurality of PUCCH resource sets.

In an example embodiment, the one or more PUCCH resource sets are allocated to transmit at least one of a scheduling request (SR), channel state information (CSI), or hybrid automatic repeat request-acknowledge/negative acknowledge (HARQ-ACK/NACK).

In an example embodiment, the one or more first parameters include at least one of a physical random-access channel (PRACH) configuration of the cell and neighboring cells, a transmission mode of the cell, a subcarrier spacing (SCS) value configured in the cell, a maximum number of UEs supported in the cell, a maximum number of scheduling requests (SRs) supported in the cell, a bandwidth associated with the cell, or a presence of dynamic spectrum sharing slots and resource sets in the cell.

In an example embodiment, the one or more second parameters include at least one of quality of service (QoS) class identifiers (QCI) characteristics of one or more services required by the UE, one or more UE capabilities, historical latency observations associated with PUCCH resources allocated to the one or more services, or a type of the UE in the cell.

In an example embodiment, the one or more parameters include a periodicity and an offset associated with corresponding PUCCH resource set.

In an example embodiment, the one or more parameters are determined by the machine learning model based on the one or more first parameters.

In an example embodiment, the present disclosure discloses a resource allocation entity associated with a base station in a communication network, the resource allocation entity comprises one or more processors; and a memory storing processor-executable instructions, which, on execution, cause the one or more processors to: identify one or more physical uplink control channel (PUCCH) resource pools to be allocated to a cell camped on by one or more user equipments (UEs), based on one or more first parameters associated with the cell, using a machine learning model; identify one or more PUCCH resources to be allocated to a UE from the one or more UEs, based on the one or more PUCCH resource pools and one or more second parameters associated with the UE, using the machine learning model; allocate one or more PUCCH resource sets from a plurality of PUCCH resource sets to each UE from the one or more UEs, based on the one or more PUCCH resources identified for the UE and one or more parameters of the plurality of PUCCH resource sets.

In an example embodiment, the one or more processors are configured to allocate the one or more PUCCH resource to transmit at least one of a scheduling request (SR), channel state information (CSI), or hybrid automatic repeat request-acknowledge/negative acknowledge (HARQ-ACK/NACK).

In an example embodiment, the one or more first parameters include at least one of physical random-access channel (PRACH) configuration of the cell and neighboring cells, a transmission mode of the cell, a subcarrier spacing (SCS) value configured in the cell, a maximum number of UEs supported in the cell, a maximum number of scheduling requests (SRs) supported in the cell, bandwidth associated with the cell, or a presence of dynamic spectrum sharing slots and resource sets in the cell.

In an example embodiment, the one or more second parameters include at least one of quality of service (QoS) class identifiers (QCI) characteristics of one or more services required by the UE, one or more UE capabilities, historical latency observations associated with PUCCH resources allocated to the one or more services, or a type of the UE in the cell.

In an example embodiment, the one or more parameters include a periodicity and an offset associated with corresponding PUCCH resource set.

In an example embodiment, the one or more parameters are determined by the machine learning model based on the one or more first parameters.

In an example embodiment, the present disclosure discloses a method performed by a user equipment (UE) in a communication network, the method comprises receiving, from a resource allocation entity associated with a base station. The method comprises one or more physical uplink control channel (PUCCH) resource sets associated with a cell; identifying a PUCCH resource set from the one or more PUCCH resource sets. The method comprises performing an uplink transmission based on a periodicity and an offset associated with the PUCCH resource set.

In an example embodiment, the one or more PUCCH resource sets are associated with one or more first parameters associated with the cell and one or more second parameters associated with the UE.

In an example embodiment, the one or more first parameters comprise at least one of physical random-access channel (PRACH) configuration of the cell and neighboring cells, a transmission mode of the cell, a subcarrier spacing (SCS) value configured in the cell, a maximum number of UEs supported in the cell, a maximum number of scheduling requests (SRs) supported in the cell, bandwidth associated with the cell, or a presence of dynamic spectrum sharing slots and resource sets in the cell.

In an example embodiment, wherein the one or more second parameters include at least one of quality of service (QoS) class identifiers (QCI) characteristics of one or more services required by the UE, one or more UE capabilities, historical latency observations associated with PUCCH resources allocated to the one or more services, and a type of the UE in the cell.

In an example embodiment, the present disclosure discloses a user equipment (UE) in a communication network. The UE comprises one or more transceivers; one or more processors coupled to the one or more transceivers; and a memory storing processor-executable instructions, which, on execution, cause the one or more processors to: receive, from a resource allocation entity associated with a base station, one or more physical uplink control channel (PUCCH) resource sets associated with a cell; identify a PUCCH resource set from the one or more PUCCH resource sets; and perform an uplink transmission based on a periodicity and an offset associated with the PUCCH resource set.

In an example embodiment, the one or more PUCCH resource sets are associated with one or more first parameters associated with the cell and one or more second parameters associated with the UE.

In an example embodiment, the one or more first parameters comprise at least one of physical random-access channel (PRACH) configuration of the cell and neighboring cells, a transmission mode of the cell, a subcarrier spacing (SCS) value configured in the cell, a maximum number of UEs supported in the cell, a maximum number of scheduling requests (SRs) supported in the cell, bandwidth associated with the cell, or a presence of dynamic spectrum sharing slots and resource sets in the cell.

In an example embodiment, the one or more second parameters include at least one of quality of service (QoS) class identifiers (QCI) characteristics of one or more services required by the UE, one or more UE capabilities, historical latency observations associated with PUCCH resources allocated to the one or more services, and a type of the UE in the cell.

The terms "an embodiment", "embodiment", "embodiments", "the embodiment", "the embodiments", "one or more embodiments", "some embodiments", and "one embodiment" may refer, for example, to "one or more (but not all) embodiments of the disclosure" unless expressly specified otherwise.

The terms "including", "comprising", "having" and variations thereof may refer, for example, to "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. A variety of optional components are described to illustrate the wide variety of possible embodiments of the disclosure.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, various embodiments of the disclosure need not include the device itself.

Figure 5:
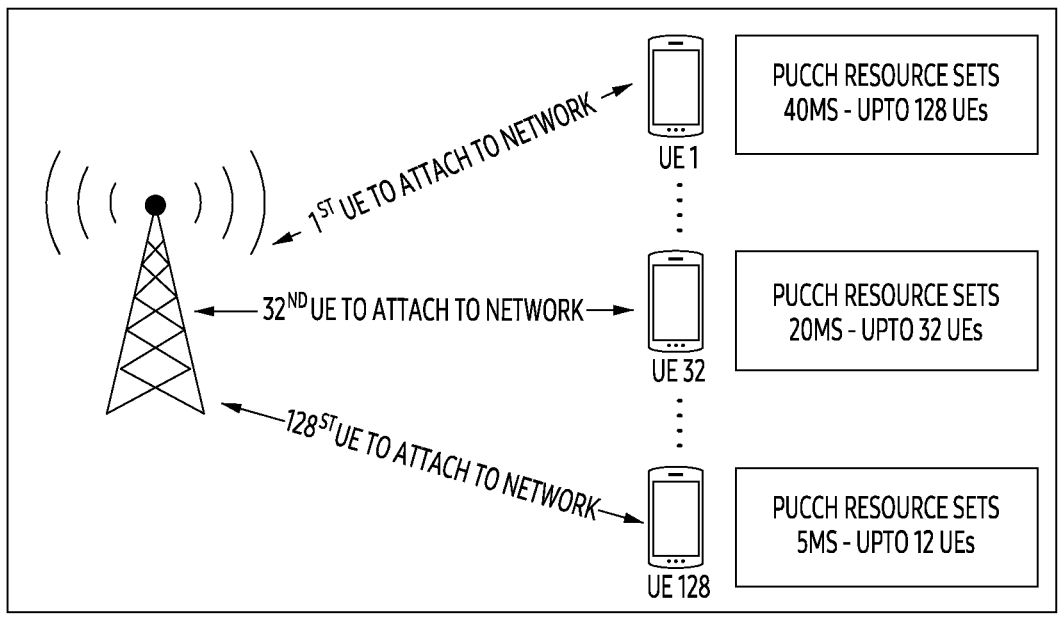
FIG. 5 is a diagram illustrating example allocation of the PUCCH resources to the UEs in the communication network, according to various embodiments.

The illustrated operations of FIG. 5 illustrates certain events occurring in a certain order. In various embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

The language used in the disclosure has been selected for readability and instructional purposes, and it may not have been selected to delineate or circumscribe the disclosed subject matter. It is therefore intended that the scope of the disclosure be limited not by this detailed description. Accordingly, the disclosure of the various example embodiments of the disclosure is intended to be illustrative, but not limiting.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by a resource allocation entity associated with a base station in the communication network in a communication network, the method comprising:

identifying, by the resource allocation entity, one or more physical uplink control channel (PUCCH) resource pools to be allocated to a cell camped on by one or more user equipments (UEs) based on one or more first parameters associated with the cell, using a machine learning model;

identifying, by the resource allocation entity, one or more PUCCH resources to be allocated to a UE from the one or more UEs, based on the one or more PUCCH resource pools and one or more second parameters associated with the UE, using the machine learning model; and allocating, by the resource allocation entity, one or more PUCCH resource sets from a plurality of PUCCH resource sets to the UE from the one or more UEs, based on the one or more PUCCH resources identified for the UE and one or more parameters of the plurality of PUCCH resource sets.

2. The method as claimed in claim 1, wherein the one or more PUCCH resource sets are allocated to transmit at least one of a scheduling request (SR), channel state information (CSI), or hybrid automatic repeat request-acknowledge/negative acknowledge (HARQ-ACK/NACK).

3. The method as claimed in claim 1, wherein the one or more first parameters include at least one of a physical random-access channel (PRACH) configuration of the cell and neighboring cells, a transmission mode of the cell, a subcarrier spacing (SCS) value configured in the cell, a maximum number of UEs supported in the cell, a maximum number of scheduling requests (SRs) supported in the cell, a bandwidth associated with the cell, or a presence of dynamic spectrum sharing slots and resource sets in the cell.

4. The method as claimed in claim 1, wherein the one or more second parameters include at least one of quality of service (QoS) class identifiers (QCI) characteristics of one or more services required by the UE, one or more UE capabilities, historical latency observations associated with PUCCH resources allocated to the one or more services, or a type of the UE in the cell.

5. The method as claimed in claim 1, wherein the one or more parameters include a periodicity and an offset associated with corresponding PUCCH resource set.

6. The method as claimed in claim 1, wherein the one or more parameters are determined by the machine learning model based on the one or more first parameters.

7. A resource allocation entity associated with a base station in a communication network, the resource allocation entity comprising:

one or more processors; and a memory storing processor-executable instructions, which, on execution, cause the one or more processors to:

identify one or more physical uplink control channel (PUCCH) resource pools to be allocated to a cell camped on by one or more user equipments (UEs), based on one or more first parameters associated with the cell, using a machine learning model;

identify one or more PUCCH resources to be allocated to a UE from the one or more UEs, based on the one or more PUCCH resource pools and one or more second parameters associated with the UE, using the machine learning model;

allocate one or more PUCCH resource sets from a plurality of PUCCH resource sets to each UE from the one or more UEs, based on the one or more PUCCH resources identified for the UE and one or more parameters of the plurality of PUCCH resource sets.

8. The resource allocation entity as claimed in claim 7, wherein the one or more processors are configured to allocate the one or more PUCCH resource to transmit at least one of a scheduling request (SR), channel state information (CSI), or hybrid automatic repeat request-acknowledge/negative acknowledge (HARQ-ACK/NACK).

9. The resource allocation entity as claimed in claim 7, wherein the one or more first parameters include at least one of physical random-access channel (PRACH) configuration of the cell and neighboring cells, a transmission mode of the cell, a subcarrier spacing (SCS) value configured in the cell, a maximum number of UEs supported in the cell, a maximum number of scheduling requests (SRs) supported in the cell, bandwidth associated with the cell, or a presence of dynamic spectrum sharing slots and resource sets in the cell.

10. The resource allocation entity as claimed in claim 7, wherein the one or more second parameters include at least one of quality of service (QoS) class identifiers (QCI) characteristics of one or more services required by the UE, one or more UE capabilities, historical latency observations associated with PUCCH resources allocated to the one or more services, or a type of the UE in the cell.

11. The resource allocation entity as claimed in claim 7, wherein the one or more parameters include a periodicity and an offset associated with corresponding PUCCH resource set.

12. The resource allocation entity as claimed in claim 7, wherein the one or more parameters are determined by the machine learning model based on the one or more first parameters.

* * * * *